Dec. 30, 1930.                H. AANONSON                1,787,029
                                 VEHICLE
                      Filed May 13, 1929    2 Sheets-Sheet 1
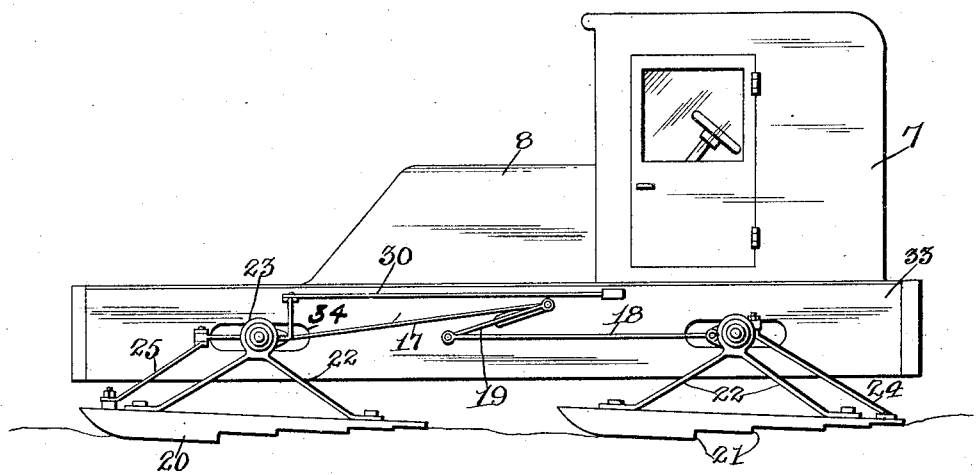
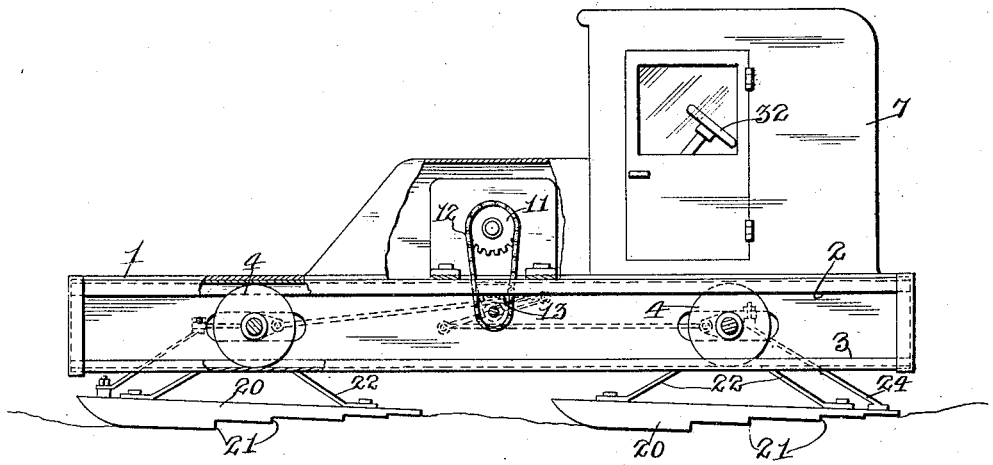
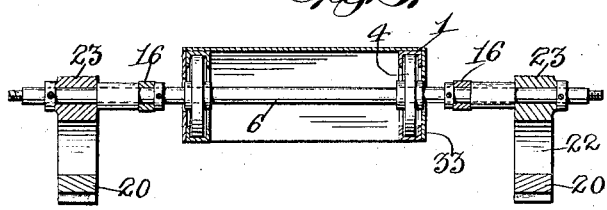
Inventor
Henry Aanonson
By
Attorneys Dec. 30, 1930.   H. AANONSON   1,787,029
VEHICLE
Filed May 13, 1929   2 Sheets-Sheet 2
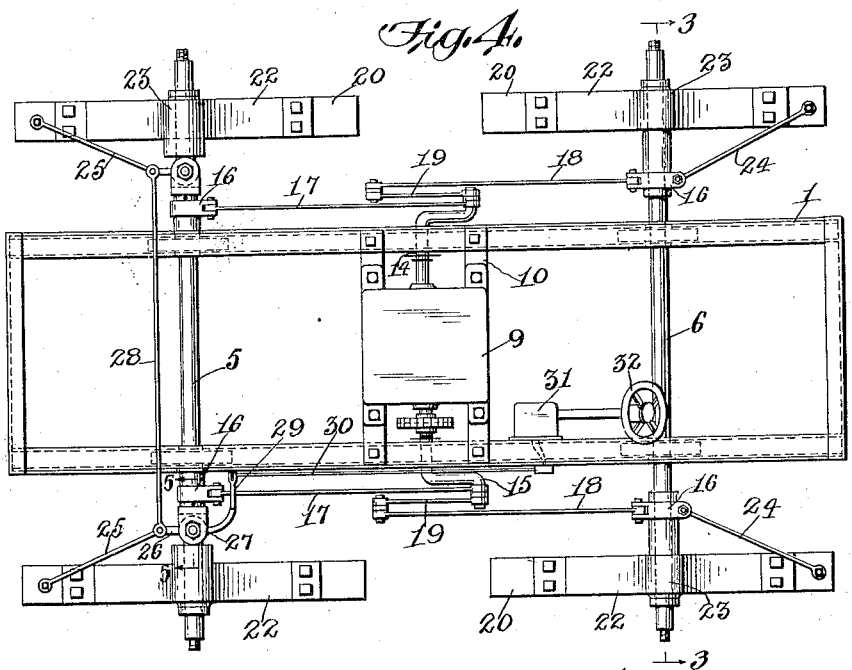
Fig.4.
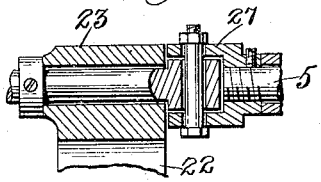
Fig.5.
Inventor
Henry Aanonson
By 
Attorneys Patented Dec. 30, 1930

1,787,029

UNITED STATES PATENT OFFICE

HENRY AANONSON, OF ELAND JUNCTION, WISCONSIN

VEHICLE

Application filed May 13, 1929. Serial No. 362,813.

This invention relates to new and useful improvements in vehicles and more particularly to a vehicle whereby the same can be propelled on wheels or on runners.

One of the objects of my invention is the provision of a vehicle of the above type including novel means for propelling a vehicle provided with runners whereby the numerous gears, connecting chains and shafts are reduced to a minimum and the movement from the motor of the vehicle being conveyed directly to the runners or wheels upon which the vehicle is mounted.

Another object of the present invention is the provision of a motor vehicle including a body mounted upon rotatable axles which are movable relative the body and upon which are mounted sled runners formed with transversely serrated lower faces for engaging the surface over which they are traveling to prevent backward movement of the runners during the operation of the vehicle.

A further object of the invention is the provision of a vehicle of the above character wherein the body is movably mounted upon transverse axles carrying sled runners having transversely serrated engaging faces whereby the sled runners are retained against movement in one direction and the connection to the vehicle motor from the shafts being such as to provide for alternating forward movement of the axles and runners carried thereby.

A still further object of the invention is the provision of a vehicle of the above type wherein the device can be supported either upon wheels or runners and novel means is provided for retaining the wheels against backward turning movement during the operation of the vehicle, said means being reversible so that the wheels can be rotated in either direction and the means operated for preventing retrograde movement of the wheels.

With the above and other objects in view, the invention consists in the novel features of construction, the combination and arrangement of parts hereinafter more fully set forth, pointed out in the claims and shown in the accompanying drawings wherein:

Figure 1 is a side elevation of a vehicle constructed in accordance with my invention;

Figure 2 is a similar view with parts thereof broken away and illustrated in cross section;

Figure 3 is a transverse section on the line 3—3 of Figure 4;

Figure 4 is a top plan view with the vehicle body removed;

Figure 5 is a detail section on the line 5—5 of Figure 4.

In the construction of my improved vehicle I provide a substantially rectangular frame or chassis 1 formed with U-shaped spaced side bars 2 and 3, the bars 2 and 3 forming upper and lower trackways for the rollers 4 on the front and rear axles 5 and 6 respectively.

Any suitable design or type of body may be carried by the frame 1 and in the present instance, I have illustrated a coupé style body 7 having a motor hood 8 in the front thereof adapted to normally cover the motor 9 which is mounted upon the transverse supporting bars 10 which are carried by the frame 1 at approximately the central portion thereof, although the location of the motor is not essential.

The motor shaft carries a sprocket 11 connected by means of a sprocket chain 12 to a second sprocket 13 on the transverse shaft 14 upon the outer ends of which are crank arms 15. Each axle 5 and 6 has attached thereto the yokes 16, the yokes on the front axle 5 being connected to the cranks 15 by means of rods 17. The yokes 16 on the rear axle 6 are connected by means of rods 18 to the outer ends of links 19, while the inner ends of the links 19 are loosely connected to the cranks 15. It will be apparent from the foregoing that upon rotation of the shaft 14, a reciprocating movement is imparted to the rods 17 and 18 which are in turn connected to the axles 5 and 6.

In the preferred form of the invention, I have illustrated sled runners 20 for supporting the vehicle and these runners are provided with the usual upwardly curved front ends and tapered in thickness toward the rear end, with the lower faces of the tapered runners formed with a plurality of transverse cut away parts providing vertical shoulders 21. Extending upwardly from the upper face of the runners are the converging brace rods 22, the upper ends of which are integral with the bearings 23 which support the axles 5 and 6. The rear runners are provided with what might be termed pull braces 24, the lower ends of which are connected to the rear ends of the runners on the rear axle 6, while the upper ends are bolted to the yokes 16. The front axles are also provided with inclined brace rods 25, the upper ends of which are connected to the forwardly projecting arms 26 of the steering knuckle 27 on each end of the forward axle 5. The arms 26 on each side of the chassis which are connected by means of a rod 28 provide for simultaneous movement of the two front runners.

The steering knuckle 27 is provided with an angular arm 29 connected by means of a rod 30, to the steering apparatus 31, mounted on the chassis beneath the body 7. The steering apparatus is controlled by means of the usual steering wheel 32.

It will be apparent from the foregoing that the operation of my improved device is as follows: In the showing in Figure 1, the rear runners have been moved forwardly and forward movement of the front runners is taking place due to the actuation of the cranks 15 and their connection to the axles. It will be apparent that as the shaft 14 rotates to the left in Figure 1, the rear runners remain stationary due to the engagement of the shoulders 21 with the surface over which the vehicle is traveling, thus the rear runners will remain stationary and the forward runners will be pushed forwardly through the connection of the rods 17. It will be noted that the connection is such that as the rear runners are pushed forwardly, the movement of the runners will be approximately twice the speed of the forward movement of the chassis 1. In order to permit independent movement of the axles 5 and 6 relative the chassis 1, the side boards 33 of the chassis are provided with longitudinal slots 34.

It will thus be apparent that as the front runners reach the forward limit of their movement, the rods 18 will then be in position to exert a forward pull to the rear axles and runners with the front runners remaining stationary and due to the fact that the movement of the runners is double, the body will be moving forwardly at all times due to the fact that the minute one set of runners reaches the limit of its forward movement, the other set of runners is starting forward on its initial forward movement, thus providing a smooth running vehicle which can travel over snow and the like and the shouldered lower face of the runners will securely grip the surface so as to provide for the proper operation of the machine.

It will be apparent from the foregoing that I have provided a comparatively simple and inexpensive vehicle of the type described wherein the usual vehicle of this type is provided with a great number of gears and chains for operating the same, but in the present instance the eccentric connection between the axles 5 and 6 and the shaft 14 will propel the vehicle forward in the manner set forth.

While I have shown and described the preferred embodiment of my invention, it will be apparent that slight changes may be made in the construction when putting the invention into practice without departing from the spirit of the same or the scope of the appended claims.

I claim:

1. A vehicle of the class described including a body, an axle at each end of the body, traction members on the ends of the axles for supporting the body, a motor carried by the body and operative connection between the motor and the axles for imparting an alternate reciprocating movement to the axles whereby one axle remains stationary while the other is in motion, the movement of the axles through their connection with the motor imparting movement to the body in the same general direction.

2. A vehicle of the class described, including a body, a motor carried thereby, an axle at each end of the body, runners at the ends of the axles for supporting the body, transverse shoulders on the lower faces of said runners and means forming operative connection between the motor and the axles for imparting movement to the axles in one direction, the shoulders on the runners retaining the runners and respective axle against movement in the opposite direction whereby the axles are alternately moved forwardly with one axle stationary while the other is in motion, thus propelling the body forwardly.

3. A vehicle of the class described including a body, a motor carried thereby, an axle supporting each end of the body, runners on the ends of the axles, transverse shoulders on the lower faces of the runners, cranks operated by the motor and having connection with the axles whereby the axles are alternately moved in one direction with the runners retained against movement in the opposite direction through engagement of the shoulders with the surface, the movement of the runners on each axle being double, the movement of the body for propelling the body forwardly.

4. A vehicle of the class described including a body, a frame comprising spaced channel portions, an axle disposed beneath each end of the body, rollers carried by the axle and movable within the channel portions, runners carried by the axles, transverse ribs on the lower faces of the runners, a motor carried by the body and means forming operative connection between the motor and the axles for alternately imparting movement to said axles to propel the vehicle forwardly through the alternate movement of the runners.

5. A vehicle of the class described including a body, spaced axles supporting said body, traction members on the ends of said axles, a motor carried by the body, means forming operation connection between the motor and the axles for alternately moving said axles in a forward direction and means for retaining one of said axles against movement during the movement of the other axle.

In testimony that I claim the foregoing I have hereunto set my hand at Eland Junction, in the county of Shawano and State of Wisconsin.

HENRY AANONSON.